United States Patent
Sun et al.

(10) Patent No.: US 12,244,540 B2
(45) Date of Patent: Mar. 4, 2025

(54) APERIODIC SOUNDING REFERENCE SIGNAL TRANSMISSION

(71) Applicant: Apple Inc., Cupertino, CA (US)

(72) Inventors: Haitong Sun, Cupertino, CA (US); Dawei Zhang, Saratoga, CA (US); Hong He, San Jose, CA (US); Huaning Niu, San Jose, CA (US); Oghenekome Oteri, San Diego, CA (US); Seyed Ali Akbar Fakoorian, San Diego, CA (US); Wei Zeng, Saratoga, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/593,796

(22) PCT Filed: Aug. 5, 2021

(86) PCT No.: PCT/CN2021/111059
§ 371 (c)(1),
(2) Date: Sep. 24, 2021

(87) PCT Pub. No.: WO2023/010492
PCT Pub. Date: Feb. 9, 2023

(65) Prior Publication Data
US 2024/0195588 A1    Jun. 13, 2024

(51) Int. Cl.
*H04L 5/00* (2006.01)

(52) U.S. Cl.
CPC ............ *H04L 5/0092* (2013.01); *H04L 5/001* (2013.01); *H04L 5/0051* (2013.01)

(58) Field of Classification Search
None
See application file for complete search history.

(56) References Cited

U.S. PATENT DOCUMENTS

| | | | |
|---|---|---|---|
| 2017/0302419 A1* | 10/2017 | Liu | ........................ H04L 5/0078 |
| 2020/0028638 A1 | 1/2020 | Liu et al. | |
| 2020/0313816 A1 | 10/2020 | Sun et al. | |
| 2021/0036825 A1 | 2/2021 | Choi et al. | |
| 2021/0143954 A1* | 5/2021 | Duan | ................. H04W 52/0216 |
| 2024/0031097 A1* | 1/2024 | Go | ........................ H04L 5/0094 |

FOREIGN PATENT DOCUMENTS

| | | |
|---|---|---|
| CN | 110324124 | 10/2019 |
| CN | 112543083 | 3/2020 |
| CN | 112787786 | 5/2021 |
| EP | 3687099 | 7/2020 |

* cited by examiner

*Primary Examiner* — Walter J Divito
(74) *Attorney, Agent, or Firm* — Fay Kaplun & Marcin, LLP

(57) ABSTRACT

Embodiments of the present disclosure relate to aperiodic sounding reference signal (SRS) transmission. According to embodiments of the present disclosure, the collision of the triggered SRS resource sets (such as, the SRS resource set being triggered too early or the triggered SRS resource sets being overlapped in time and/or frequency domain) may be well handled, and the configuring and updating procedures for SRS resource may be more flexible.

18 Claims, 14 Drawing Sheets

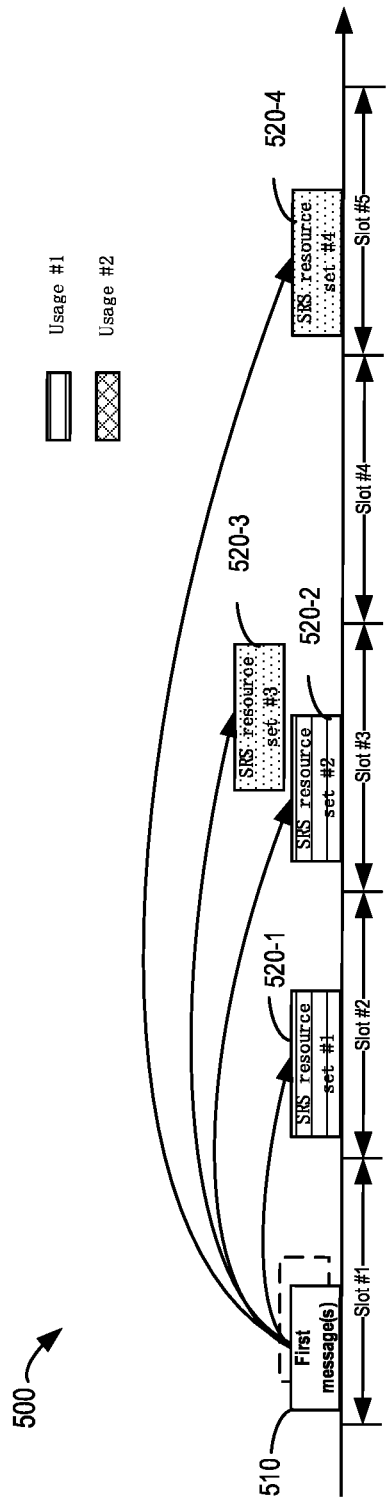

APERIODIC SOUNDING REFERENCE SIGNAL TRANSMISSION

TECHNICAL FIELD

Embodiments of the present disclosure generally relate to the field of telecommunications, and in particular, to aperiodic sounding reference signal (SRS) transmission.

BACKGROUND

In a wireless communications system, communications between a user equipment (UE) and a network device (such as, a base station, BS) may include communication of SRSs. Specifically, the UE may transmit the SRSs to the network device, and the network device may receive and measure the SRSs for generating a channel estimate of a wireless channel between the UE and the network device. Currently, SRSs may be transmitted aperiodically, semi-persistently, or periodically.

SUMMARY

In general, example embodiments of the present disclosure provide a solution for aperiodic SRS transmission.

In a first aspect, there is provided a processor of a UE configured to perform operations comprising receiving one or more first messages for triggering an aperiodic SRS transmission from a network. The one or more first messages indicate at least one SRS resource set. The at least one SRS resource set includes a first resource set being at least partially overlapping with a second resource set of the at least one SRS resource set. Alternatively, on in addition, the at least one SRS resource set includes a third resource set of the at least one SRS resource set, being configured with a timing offset smaller than a timing offset threshold. The operations further comprise performing, with the network, the aperiodic SRS transmission based on the one or more first messages.

In a second aspect, there is provided a processor of a UE configured to perform operations comprising receiving a second message for configuring resources for an aperiodic SRS transmission from a network. The second message comprises information indicating a SRS resource set. The information comprises an identification of a component carrier (CC) corresponding to the SRS resource set. Alternatively, or in addition, the information comprises a plurality of aperiodic SRS resource trigger states corresponding to the SRS resource set.

In a third aspect, there is provided a processor of a UE configured to perform operations comprising a MAC CE used for updating an aperiodic SRS resource configuration at the UE from a network updating the aperiodic SRS resource configuration based on the MAC CE. The operations further comprise updating the aperiodic SRS resource configuration based on the MAC CE.

In a fourth aspect, there is provided a UE, comprising: the processor of any of the first aspect to the third aspect, and a transceiver communicatively coupled to the processor and configured to communicate with a network.

In a fifth aspect, there is provided a processor of a BS configured to perform operations comprising transmitting one or more first messages for triggering an aperiodic SRS transmission to a UE. The one or more first messages indicate at least one SRS resource set. The at least one SRS resource set includes a first resource being at least partially overlapping with a second resource set of the at least one SRS resource set. Alternatively, or in addition, at least one SRS resource set includes a third resource set being configured with a timing offset smaller than a timing offset threshold. The operations further comprise performing, with the UE, the aperiodic SRS transmission based on the one or more first messages.

In a sixth aspect, there is provided a processor of a BS configured to perform operations comprising generating a second message for configuring resources for an aperiodic SRS transmission. The second message comprises information indicating a SRS resource set. In some embodiments, the information comprises an identification of a CC corresponding to the SRS resource set. Alternatively, or in addition, the information comprises a plurality of aperiodic SRS resource trigger states corresponding to the SRS resource set. The operations further comprise transmitting the second message to a UE.

In a seventh aspect, there is provided a processor of a BS configured to perform operations comprising a MAC CE used for updating an aperiodic SRS resource configuration at the UE. The operations further comprise transmitting the MAC CE to the UE.

In an eighth aspect, there is provided a processor of a BS configured to perform operations comprising transmitting one or more first messages for triggering an aperiodic SRS transmission to a UE. The one or more first messages indicate at least one SRS resource set. Each of the at least one SRS resource set is not overlapping with other resource set of the at least one SRS resource set, such that the UE is not expected to be triggered to perform the aperiodic SRS transmission on overlapped resource. Alternatively, each of the at least one SRS resource set is configured with a timing offset equal to or longer than a timing offset threshold, such that the UE is not expected to be triggered to perform the aperiodic SRS transmission on an SRS resource set with a timing offset smaller than the timing offset threshold. The operations further comprise performing the aperiodic SRS transmission based on the one or more first messages with the UE.

In an ninth aspect, there is provided a BS, comprising: the processor of any of the fifth to the eighth aspects, and a transceiver communicatively coupled to the processor and configured to communicate with a UE.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 5 illustrates a schematic diagram of correspondence of the first message(s) and the at least one SRS resource set.

Throughout the drawings, the same or similar reference numerals represent the same or similar element.

DETAILED DESCRIPTION

Figure 1:
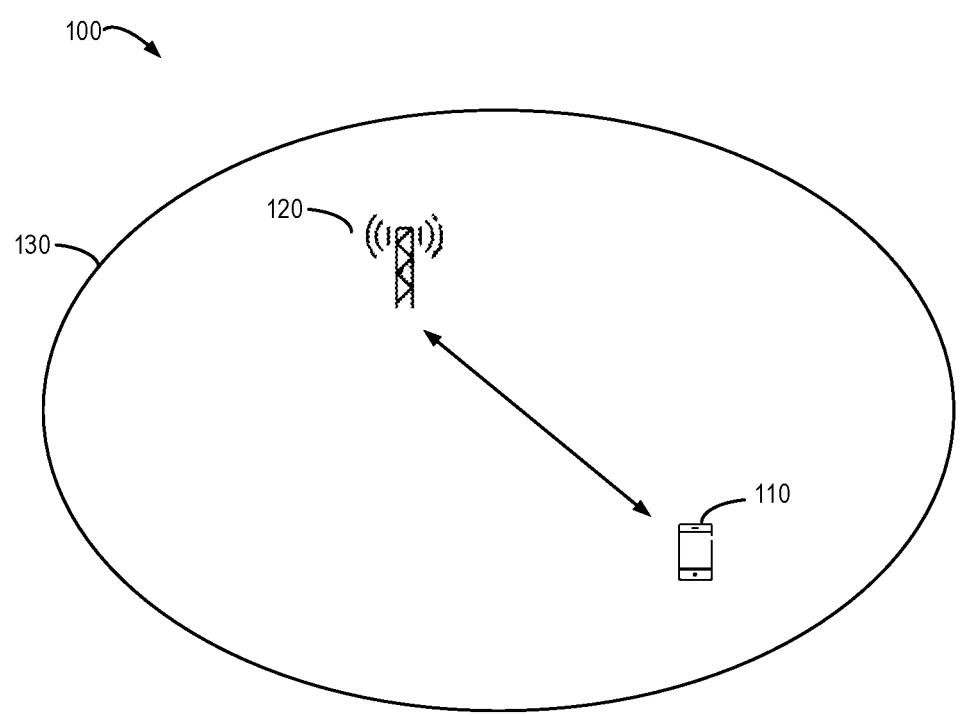
FIG. 1 illustrates an example communication network in which example embodiments of the present disclosure can be implemented.

Principles of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

The terminology used herein is for the purpose of describing particular embodiments only and is not intended to be limiting of example embodiments. For example, as used herein, the singular forms "a", "an" and "the" are intended to include the plural forms as well, unless the context clearly indicates otherwise. The terms "comprises", "comprising", "has", "having", "includes" and/or "including", when used herein, specify the presence of stated features, elements, and/or components etc., but do not preclude the presence or addition of one or more other features, elements, components and/or combinations thereof. Moreover, when a particular feature, structure, or characteristic is described in connection with some embodiments, it is submitted that it is within the knowledge of one skilled in the art to affect such feature, structure, or characteristic in connection with other embodiments whether or not explicitly described.

It is also to be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As mentioned above, the SRSs may be transmitted aperiodically, semi-persistently, or periodically between the UE and the BS. In a conventional solution, when configuring aperiodic SRS resources, the BS may configure the UE with one or more SRS resource sets, for example, using a higher layer parameter (for example, SRS-ResourceSet) in a radio resource control (RRC) message. Further, a plurality of higher layer parameters may be comprised in each SRS-ResourceSet, such as, usage, slotOffset, resourceType, aperiodicSRS-ResourceTrigger and so on. In addition, the BS may re-configure the SRS resources via a RRC message.

After the configuration of the SRS resource has been completed, the BS may trigger the UE to perform SRS transmission via a downlink control information (DCI) message. In release $15/16$ of 3rd Generation Partnership Project (3GPP) standard, five DCI formats DCI (i.e., DCI format 0_1, DCI format 0_2, DCI format 1_1, DCI format 1_2 and DCI format 2_3) may be used to trigger an aperiodic SRS transmission.

Specifically, the BS indicates the aperiodicSRS-ResourceTrigger with two bits in the DCI message. As the same AP SRS trigger state may be configured to more than one SRS resource set, the BS can trigger multiple AP SRS resource sets with the same AP SRS trigger state (i.e., aperiodicSRS-ResourceTrigger). As for the UE, based on the parameter aperiodicSRS-ResourceTrigger indicated by the DCI and the parameters (such as, slotOffset) comprised in each SRS-ResourceSet, the UE may determine the resource for transmitting the aperiodic SRSs. If the UE determines that the SRS resource with the corresponding slotOffset is invalid, for example, colliding with downlink transmission, the UE will skip/drop the SRS resource.

Recently, some agreements have been reached to improve the flexibility of the SRS triggering mechanism. The agreements include the following:

For each aperiodic SRS resource set, a list of up to 4 slot offsets can be configured;

A new field, up to 2 bits, may be introduced in DCI Format 0_1, 0_2, 1_1, 1_2, where the new field may dynamically indicate the slot offset of the aperiodic SRS; and The slot offset is counted as the available slot instead of any slot.

Although the above agreements have been reached, there are still pending issues when triggering the aperiodic SRS transmission. For example, in a conventional solution, one DCI message can merely trigger SRS transmission for one CC (for example, the CC carrying the DCI message would be considered as the CC corresponding to the SRS resource set). If the BS wants to trigger SRS transmission on another CC, the BS has to transmit another DCI message. Further, in the conventional solution, one SRS-ResourceSet can be configured with only one aperiodicSRS-ResourceTrigger.

In addition, the conventional solution merely considers the collision between the SRS resource and the downlink transmission. However, according to the conventional solution, the operations of configuring aperiodic SRS resources and trigging aperiodic SRS transmission are implemented in separate messages (i.e., RRC message and DCI message) and further one or more DCI messages may be transmitted to the UE to trigger the aperiodic SRS transmission. Therefore, more than one SRS resource sets may be triggered by the BS, where some of the SRS resource sets may be triggered too early (i.e., does not meet the minimum timing offset requirement) and some of the SRS resource sets may be overlapping with each other in time and/or frequency domain. However, no discussion has been made about how to handle such SRS resource sets.

The above mentioned issues are merely illustrated as examples of the pending issues. According to the embodiments of the present disclosure, at least part of the above issues may be addressed.

Embodiments of the present disclosure propose a solution for improving the flexibility of the aperiodic SRS triggering mechanism. According to embodiments of the present disclosure, the collision of the triggered SRS resource sets (such as, the SRS resource set being triggered too early or the triggered SRS resource sets being overlapped in time and/or frequency domain) may be well handled, and the configuring and updating procedures for SRS resource may be more flexible.

In the following text, a message for triggering the aperiodic SRS transmission is referred to as a first message. Further, a DCI message will be used as an example of the first message. It is noted that example embodiments of the present disclosure with regard to DCI message are equally applicable to other types of messages when the other types of messages are used for triggering the SRS transmission.

In the following text, a message for configuring the aperiodic SRS resources is referred to as a second message. Further, a RRC message will be used as an example of the second message. It is noted that example embodiments of the present disclosure with regard to RRC message are equally applicable to other types of messages when the other types of messages are used for configuring the aperiodic SRS resources.

FIG. 1 shows an example communication network 100 in which embodiments of the present disclosure can be implemented. The communication network 100 includes a BS 120 and UE 110 served by the BS 120. The communication network 100 may provide one or more serving cells 130 to serve the UE 110.

In the communication network 100, the BS 120 can communicate data and control information to the UE 110 and the UE 110 can also communication data and control information to the BS 120. A link from the BS 120 to the UE 110 is referred to as a downlink or a forward link, while a link from the UE 110 to the BS 120 is referred to as an uplink or a reverse link.

Further, carrier aggregation (CA) can be supported in the communication network 100, in which two or more CCs are aggregated in order to support a broader bandwidth. In the specific example of FIG. 1, both intra-band CA and inter-band CA are supported.

In addition, the BS 120 may transmit a second message (such as, a RRC message) for configuring aperiodic SRS resources (such as, via a higher layer parameter SRS-ResourceSet) for the UE 110. In some embodiments, a higher layer parameter "usage" may be comprised in each SRS-ResourceSet. The parameter "usage" may be one of "beamManagement", "codebook", "nonCodebook" and "antennaSwitching". In some embodiments, other higher layer parameters (such as, slotOffset, aperiodicSRS-ResourceTrigger) also may be comprised in each SRS-ResourceSet.

Further, the BS 120 may transmit one or more first messages (such as, DCI message) for triggering an aperiodic SRS transmission to the UE 110. After receiving the one or more first messages, the UE 110 may determine corresponding SRS resource set(s) and perform the aperiodic SRS transmission accordingly.

It is to be understood that the numbers of UE 110, BS 120 and cell 130 as shown in FIG. 1 are only for the purpose of illustration without suggesting any limitations. The communication network 100 may include any suitable number of BS, UE and cell adapted for implementing embodiments of the present disclosure.

Principle and implementations of the present disclosure will be described in detail below with reference to FIGS. 2-6.

As discussed above, in the conventional solution, one DCI message may merely trigger aperiodic SRS transmission on one CC and further the one SRS-ResourceSet may be configured with only one aperiodicSRS-ResourceTrigger.

According to some example embodiments of the present disclosure, there is provided a solution for improving the flexibility of the SRS triggering mechanism. In the solution, the BS 120 generates and transmits a second message (such as, RRC message) for configuring aperiodic SRS resources to the UE, where the second message comprises information indicating an SRS resource set. In particular, the information comprises an identification of a CC corresponding to the SRS resource set. In this way, an association between the SRS resource set and its corresponding CC is established. Further, the CC carrying the first message and the CC of the SRS resource set(s) indicates by the first message may be different.

Alternatively, or in addition, in some embodiments, the information used for indicating the SRS resource set comprises a plurality of aperiodic SRS resource trigger states. Additionally, in some embodiments, each of the aperiodic SRS resource trigger states can be configured in the same CC or different CCs. For example, the same aperiodic SRS resource trigger state is configured in different SRS resource sets, and the different SRS resource sets are configured with different CCs. In this way, the association between the aperiodic SRS resource trigger state (i.e., aperiodicSRS-ResourceTrigger) and the SRS resource set is more flexible.

According to the embodiments of the present disclosure, different SRS resource sets configured with the same aperiodicSRS-ResourceTrigger may be configured with different CCs. As a result, using a single DCI to trigger aperiodic SRS transmission in multiple CCs is enabled.

Figure 2:
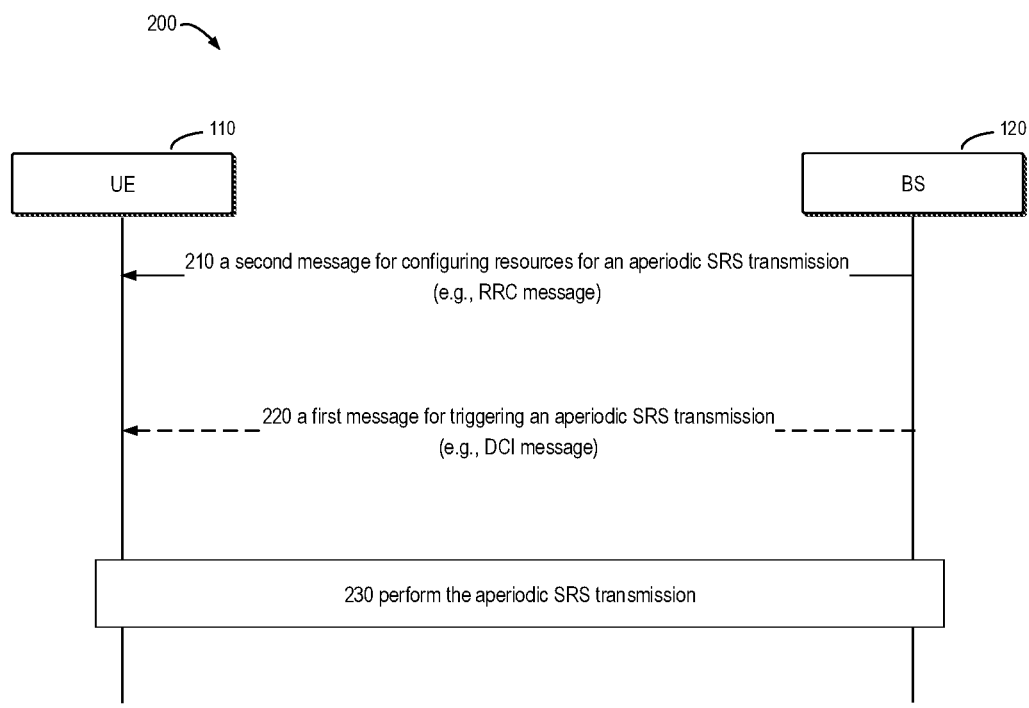
FIG. 2 illustrates a signaling flow for enabling using a single DCI to trigger aperiodic SRS transmission in multiple CCs according to some example embodiments of the present disclosure.

The above procedure will be described with reference to FIG. 2. FIG. 2 illustrates a signaling flow 200 for enabling using single DCI to trigger aperiodic SRS transmission in multiple CCs according to some example embodiments of the present disclosure. For the purpose of discussion, the signaling flow 200 will be described with reference to FIG. 1. The signaling flow 200 may involve a UE 110 and a BS 120.

In the signaling flow 200, the BS 120 transmits 210 a second message (such as, a RRC message) for configuring aperiodic SRS resources to the UE, where the second message may indicate at least one SRS resource set.

In some embodiments, each SRS resource set indicated by the second message comprises an identification of a CC of the corresponding SRS resource set. Specifically, a new information element (IE) may be introduced to indicate the corresponding CC. The newly-introduced IE may be represented by any suitable parameter. One example of the suitable parameter is the index of serving cell (i.e, Serving-CellIndex).

As one specific example, the BS 120 transmits a RRC message to the UE 110, where the RRC message comprises a plurality of higher parameters "SRS-ResourceSet". One specific example of part of parameter SRS-ResourceSet is illustrated as below.

```
SRS-ResourceSet :: = SEQUENCE {
  srs-ResourceSetId SRS-ResourceSetId,
  srs-ResourceIdList SEQUENCE (SIZE(1..maxNrofSRS-ResourcePerSet)) OF SRS-ResourceId OPTIONAL, -- Cond Setup
  resourceType CHOICE {
    aperiodic SEQUENCE {
      aperiodicSRS-ResourceTrigger INTEGER (1..maxNrofSRS-TriggerStates-1)
      servingCellId ServeCellIndex
      csi-RS NZP-CSI-RS-ResourceId OPTIONAL, -- Cond NonCodebook
      slotOffset INTEGER (1..32) OPTIONAL, -- Need S
      ...,
      [[
      aperiodicSRS-ResourceTriggerList SEQUENCE (Size (1..maxNrofSRS-TriggerStates-2))
        OF INTEGER (1..maxNrofSRS-TriggerStates-1) OPTIONAL -- Need M
      ]]
    }
}
```

Alternatively, or in addition, in some embodiments, the information used for indicating the SRS resource set (such as, the higher parameters SRS-ResourceSet) may comprise a plurality of aperiodic SRS resource trigger states (i.e., aperiodicSRS-ResourceTrigger). Additionally, in some embodiments, each of the aperiodic SRS resource trigger states can be configured in the same CC or different CCs.

After the configuration of the SRS resource has been completed, the BS 120 transmits 220 a first message (for example, a DCI message) to trigger the UE 110 to perform an aperiodic SRS transmission. Based on the received first message, the UE 110 may determine corresponding SRS resources and performs 230 the aperiodic SRS transmission with BS 120 thereby.

Further, as discussed above, in the conventional solution, the BS 120 uses the RRC message to update/re-configure the aperiodic SRS resource configuration. However, the periodicity of RRC message is relative longer. Therefore, there is a desirable require to provide a solution enabling updating/re-configuring the SRS resource configuration flexible and in time.

According to some example embodiments of the present disclosure, there is provided a solution for improving the flexibility of updating/re-configuring the aperiodic SRS resource configuration. In the solution, the BS 120 uses a MAC CE to update the aperiodic SRS resource configuration at the UE 110.

In this way, as the MAC CE may be transmitted more flexibly and quickly compared with the RRC message, the operation of updating/re-configuring the SRS resource configuration may be implemented in time.

Figure 3:
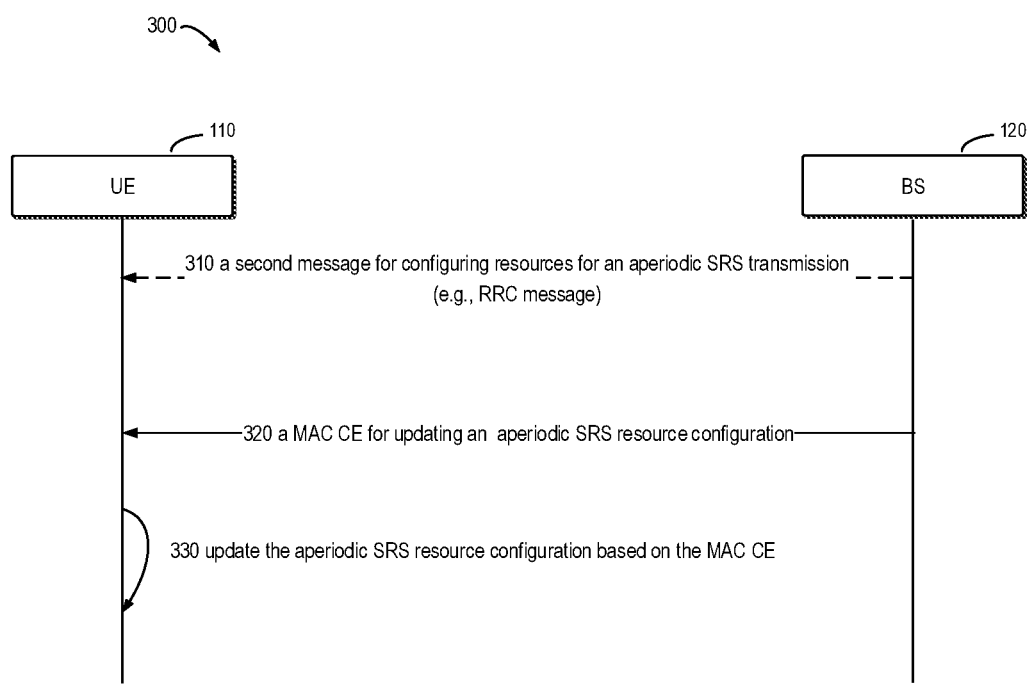
FIG. 3 illustrates a signaling flow for updating the SRS resource configuration according to some example embodiments of the present disclosure.

The above procedure will be described with reference to FIG. 3. FIG. 3 illustrates a signaling flow 300 for updating the aperiodic SRS resource configuration according to some example embodiments of the present disclosure. For the purpose of discussion, the signaling flow 300 will be described with reference to FIG. 1. The signaling flow 300 may involve a UE 110 and a BS 120.

In the signaling flow 300, the BS 120 transmits 310 a second message (such as, a RRC message) for configuring resources for an aperiodic SRS transmission to the UE. In the following, the BS 120 transmits 320 a MAC CE for updating the aperiodic SRS resource configuration configured by the second message. The UE 110 may update 330 the aperiodic SRS resource configuration based on the MAC CE.

Additionally, the MAC CE may be used to update any aperiodic SRS configuration according to different scenarios or requirements. As one specific scenario, the MAC CE is used to update a mapping between a SRS resource set and at least one aperiodic SRS resource trigger state. For this specific scenario, the MAC CE may indicate an identification of the SRS resource set and information about the at least one of aperiodic SRS resource trigger state. Additionally, the MAC CE may indicate other parameters, such as, a cell identification of the SRS resource set, a bandwidth part (BWP) identification of the SRS resource set, an indication that indicates whether the SRS resource set corresponds to supplementary uplink (SUL) and so on.

In another example scenario, the MAC CE is used to update a SRS configuration for antenna switching. For this specific scenario, the MAC CE may indicate a cell identification of a SRS resource set, a BWP identification of the SRS resource set, an indication that indicates whether the SRS resource set corresponds to SUL and an identification of the SRS resource set. Optionally, in some embodiments, the MAC CE may indicate the information about activation or de-activation of SRS resources included in the SRS resource set, or the number of ports for each SRS resource.

It is to be understood that the above mentioned parameters comprised in the MAC CE are merely purpose of illustration without any limitation. In some other embodiments, when any of the above parameters is pre-configured or may be obtained from another manner, the parameter may be absent, while some additional parameters may be added due other specific scenarios or requirements.

In addition, as discussed above, in conventional solution, the operations of configuring aperiodic SRS resources and trigging aperiodic SRS transmission are implemented in separate messages (i.e., RRC message and DCI message) and further the BS may transmit more than one first message to trigger the aperiodic SRS transmission. Therefore, more than one SRS resource sets may be triggered by the BS, where some of the SRS resource sets may be triggered too early (i.e., does not meet the minimum timing offset requirement) and some of the SRS resource sets may be overlapping with each other. However, no discussion has been made about how to handle such SRS resource sets. In the following, processes about how to handle such SRS resource sets will be discussed in detail.

In the following text, the first and the second SRS resource sets will be used as examples of the overlapped SRS resource sets triggered by the BS 120. It should be understood that in other embodiments, there may be more than two SRS resource sets being overlapped. Operations discussed herein with regard to the first and the second SRS resource sets are equally applicable to other overlapped SRS resource sets.

Further, in the following text, the third SRS resource set will be used as an example SRS resource set being triggered too early. It should be understood that in other embodiments, there may be more than one SRS resource set being triggered too early. Operations discussed herein with regard to the third SRS resource set are equally applicable to other SRS resource sets being trigged too early.

Handling on the overlapped SRS resource sets will be discussed first. According to some example embodiments of the present disclosure, the UE 110 is not expected to be triggered to perform the aperiodic SRS transmission on overlapped resources (i.e., overlapped SRS resource sets).

Figure 4:
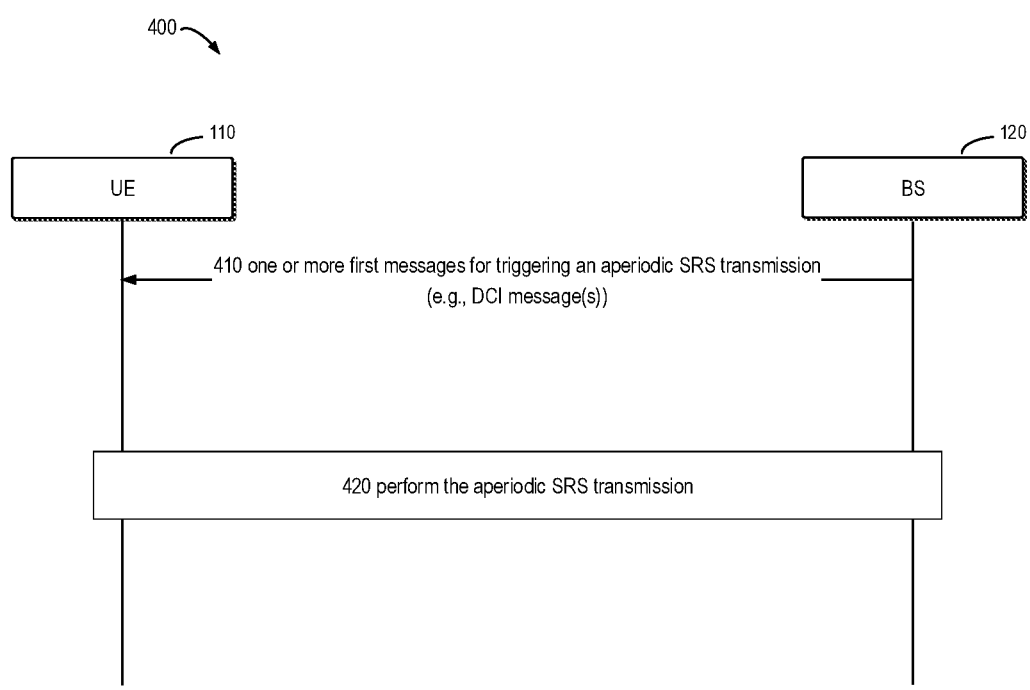
FIG. 4 illustrates a signaling flow for triggering the UE to perform the aperiodic SRS transmission according to some example embodiments of the present disclosure.

Reference is now made to FIG. 4, which illustrates a signaling flow 400 for triggering the UE 110 to perform the aperiodic SRS transmission. For the purpose of discussion, the signaling flow 400 will be described with reference to FIG. 1. The signaling flow 400 may involve a UE 110 and a BS 120.

In operation, the BS 120 transmits 410 first message(s) (such as, DCI message(s)) for triggering an aperiodic SRS transmission to the UE 110, where the first message(s) may indicate at least one SRS resource set. In particular, each of the at least one SRS resource set is not overlapping with any other resource set of the at least one SRS resource set. It is to be understood that the BS 120 may avoid triggering overlapped SRS resource sets by a plurality of manner. In one example, the BS 120 may avoid triggering overlapped SRS resource sets by a re-configuring procedure, for example, by transmitting a RRC re-configuration message or a MAC CE for updating the SRS resource configuration as discussed above. In another example, the BS 120 may avoid triggering overlapped SRS resource sets by executing an intelligent algorithm. In this way, no additional improvement is needed at the UE 110 side.

Alternatively, overlapped SRS resource sets are conditionally allowed to be triggered. For example, in some embodiments, such overlapped resource sets are allowed/expected only when the overlapped resource sets are triggered by the same first message (such as, same DCI message).

Still refer to FIG. 4. The UE 110 is expected to receive 410 one first message indicating at least one SRS resource set, where the at least one SRS resource set comprises a first resource set and a second resource set that are at least partially overlapping with each other.

For better understand, reference is made to FIG. 5, which illustrates a schematic diagram 500 of correspondence of the first message(s) and the at least SRS resource set. It is to be understood that the numbers and their correspondence relationships of first message(s) 510 and SRS resource set 520-1 to 520-4 as shown in FIG. 5 are only for the purpose of illustration without suggesting any limitations.

As illustrated in the specific example of FIG. 5, the SRS resource set #2 and SRS resource set #3 are overlapping with each other. According to some embodiments of the present disclosure, the SRS resource set #2 and SRS resource set #3 are expected to be triggered only if the SRS resource set #2 and SRS resource set #3 are indicated/triggered by same first message.

Alternatively, in some embodiments, the overlapped SRS resource sets are expected to be triggered either by the same first message or by different first messages. Still refer to FIG. 4. The UE 110 is expected to receive 410 more than one first message indicating the at least one SRS resource set, where the at least one SRS resource set includes a first resource set and a second resource set that are at least partially overlapping with each other. In the specific example of FIG. 5, the SRS resource set #2 and SRS resource set #3 are expected to be triggered either by the same first message or by different first messages.

After communicating the first message(s), the BS 120 and the UE 110 may perform 420 the aperiodic SRS transmission based on the first messages(s).

Further, due to the limitation of such as hardware and process logic, the UE 110 may not support transmitting SRS on the overlapped SRS resource sets concurrently. In this event, both the UE 110 and the BS 120 need some further improvements as will be discussed below. It is to be understood that the operations of the BS 120 are corresponding to those of the UE 110. In other words, the behaviors of the UE 110 should be predictable for the BS 120. Therefore, in the following text, although some operations are described in perspective of the UE 110, those descriptions should also be considered to be applicable to the BS 120.

Further, as for a scenario of intra-band CA (i.e., across multiple CCs in CA operation that reside in the same frequency band), the CCs comprised in the same band usually sharing a same power amplifier (PA). Therefore, all the below discussions should be applicable for the scenario of intra-band CA. For example, in some embodiments, a first resource set and a second resource set are overlapping with each other, where the first resource set corresponds to a first CC of a first frequency band, and the second first resource set corresponds to a different second CC of the same first frequency band.

Further, as for a scenario of inter-band CA (i.e., across multiple CCs in CA operation that reside in the different frequency bands), all the below discussion applicable to the band combination. For example, a first resource set and a second resource set are overlapping with each other, where the first resource set corresponds to a first CC of a first frequency band, and the second first resource set corresponds to a different second CC of the different second frequency band. In addition, additional process for the inter-band CA also will be disused in the following text.

In some embodiments, the UE 110 handle the overlapped resource sets by dropping at least part of resources included in the overlapped resource sets (i.e., the first and the second resource sets).

Additionally, the dropping procedure may be implemented in any suitable manner. Reference is made to FIGS. 6A-6D, which illustrate schematic diagram of example processes 600, 620, 630, 640 for the overlapped resource sets, respectively. For the purpose of discussion, the example processes 600, 620, 630, 640 will be described with reference to FIG. 5. The example processes 600, 620, 630, 640 may involve the SRS resource set #2 and the SRS resource set #3 as illustrated in FIG. 5. Further, it is to be understood, although not shown in FIGS. 6A-6D, some margin may be considered when dropping the related resources.

Figure 6A:
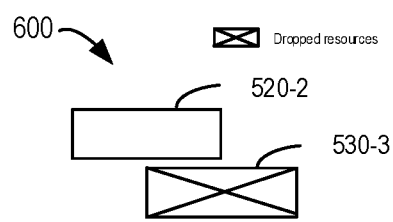
FIGS. 6A-6D illustrate schematic diagrams of example processes for the overlapped SRS resource sets.
Figure 6B:
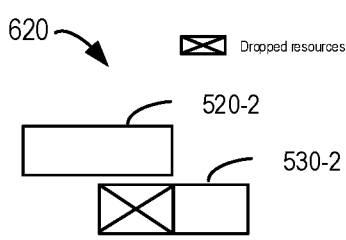
Figure 6C:
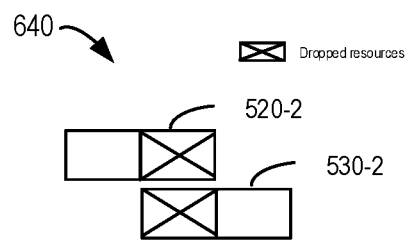

Additionally, any suitable rule may be applied when dropping the related resources. In one specific example, the UE 110 selects and drops one of the overlapped resource sets partially (e.g., as shown in FIG. 6A). In another specific example, the UE 110 drops the overlapped resources from both the overlapped resource sets (e.g., as shown in FIG. 6C).

Additionally, in some embodiments, the UE 110 may determine a target/surviving resource set (or the other resource set, also referred to as the scarified resource set) from the overlapped SRS resource sets first according to a pre-configured policy. In the specific examples of FIGS. 6A-6D, the SRS resource set #2 520-2 is determined to be the target/surviving resource set.

After determining the target/surviving resource set (or the other resource set/the scarified resource set), the UE 110 drops the related resources. In some embodiment, the UE 110 drops resources of other resource set rather than the target/surviving resource set. As illustrated in FIG. 6A, the UE 110 drops the resources of the SRS resource set #3 520-3.

Alternatively, in some embodiment, the UE 110 drops the overlapped resources from the other resource set. As illustrated in FIG. 6B, the UE 110 drops the overlapped resources from the SRS resource set #3 520-3.

Alternatively, in some embodiment, the UE 110 drops the overlapped resources from the target and the other source sets. As illustrated in FIG. 6C, the UE 110 drops the overlapped resources from SRS resource set #2 520-2 and the resources of the SRS resource set #3 520-3.

Figure 6D:
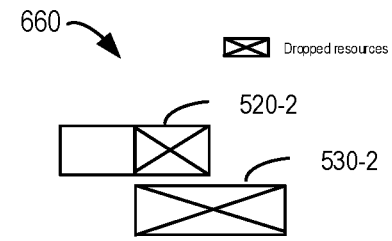

Alternatively, in some embodiment, the UE 110 drops the overlapped resources from the target resource set and the resources of the other resource set. As illustrated in FIG. 6D, the UE 110 drops the overlapped resources from SRS resource set #2 520-2 and the SRS resources of the SRS resource set #3 520-3.

In some embodiments, in case that overlapped resource sets are conditionally allowed to be triggered, the UE 110 drops at least part of resources included in the first and second resource sets only when the first and second resource sets are indicated by the same first message.

Additionally, in order to drop the related resources more reasonably, some factors may be considered when dropping the related resources. Alternatively, or in addition, the factors also may be considered when determining the target/surviving resource set or the other resource set/the scarified resource set.

One example of the factors may be usage of the overlapped SRS resource sets. In some embodiments, the usages comprise but not limited to beamManagement, codebook, nonCodebook and antennaSwitching. In some embodiments, the UE 110 may drop the related resources according to the pre-defined usage sequence. One example usage sequence may be beamManagement>codebook>antennaSwitching>nonCodebook. In other embodiments, other usage sequences may also be defined.

Another example of the factors may be identifications of the SRS resource sets. In one embodiment, the UE 110 drops the related resources in ascending order of identifications of the SRS resource sets. Alternatively, in another embodiment, the UE 110 drops the related resources in descending order of identifications of the SRS resource sets.

A further example of the factors may be the numbers of resources included in the overlapped resource sets. In one embodiment, the UE 110 determines the SRS resource set with the lager number of resources as the target/surviving resource set. Alternatively, in another embodiment, the UE 110 determines the SRS resource set with the smaller number of resources as the target/surviving resource set.

Other example of the factors may be the priorities of the SRS resource set. More specifically, each SRS resource set may be configured with a priority and the UE 110 may drop the related resource according the pre-configured priorities.

Additionally, some factors may be considered for a specific scenario. As discussed, according to some embodiments of the present disclosure, it is supported that the overlapped SRS resource set may be triggered by different first messages. For this specific scenario, the receiving sequence of the different messages also may be used as a factor when dropping the related resources. In one embodiment, the SRS resources set(s) triggered by the later received first message will be dropped. Alternatively, in another embodiment, the SRS resource(s) sets triggered by the early received first message will be dropped.

As another specific scenario of inter-band CA, the different frequency bands of the overlapped SRS resource set also may be used as a factor when dropping the related resources. For example, the UE 110 determines the SRS resource set with the preferred band as the target/surviving resource set. In one embodiment, the preferred band(s) is pre-defined by such as the network operator, service provider or wireless standard organization (such as, 3GPP). In another embodiment, the preferred band(s) is reported as UE capability.

It is to be understood that the above factors are for purpose of illustration without any limitation. In other examples, other factors may be considered when dropping the related resource (such as, using other factors to determine the target/surviving SRS resource set or the other/scarified resource set.) It is also to be understood that the above factors may be applied separately or in any suitable sub-combination and any suitable order.

Additionally, some of the triggered SRS resource sets are linked through one specific property. For example, some of the triggered SRS resource sets are configured with the same usage (such as, beamManagement, codebook, nonCodebook and antennaSwitching). In some embodiments, operations (such as, dropping) on the linked SRS resource sets are consistently, especially when the linked SRS resource sets are triggered by the same first message.

In some embodiments, the UE 110 determines usage of the dropped resources and drops other resources configured with the same usage from the at least one SRS resource set. In other words, for the multiple SRS sets triggered by the same first message, the SRS resource sets with the same usage will be dropped simultaneously. In the specific example of FIG. 5, the SRS resource set #3 520-3 and the SRS resource set #4 520-4 are configured with the same usage (such as, antennaSwitching). If the SRS resource set #3 520-3 is determined to be dropped by the UE 110, the SRS resource set #4 520-4 is dropped accordingly.

Alternatively, in some embodiments, the UE 110 determines usage of the dropped resource and determines whether to drop the other resources configured with the same usage independently. In the specific example of FIG. 5, the SRS resource set #3 520-3 and the SRS resource set #4 520-4 are configured with the same usage (such as, antennaSwitching) and the SRS resource set #3 520-3 is determined to be dropped by the UE 110. The UE 110 determines whether to drop the SRS resource set #4 520-4 based on other factor(s) as discussed above independently.

In addition to the overlapped SRS resources sets, some SRS resource set(s) may be triggered too early (for example, configured with a timing offset smaller than a timing offset threshold), which causes that the UE 110 does not have sufficient time to schedule the SRS transmission on the trigged SRS resource set.

According to some example embodiments of the present disclosure, the UE is not expected to be triggered to perform the aperiodic SRS transmission on the SRS resource set configured with a timing offset smaller than the timing offset threshold.

Reference is now made to FIG. 4 again. In operation, the BS 120 transmits 410 first message(s) (such as, DCI message(s)) for triggering an aperiodic SRS transmission to the UE 110, where the first message(s) are used to indicate at least one SRS resource set. In particular, each of the at least one SRS resource set is configured with a timing offset equal to or longer than a timing offset threshold, such that the UE 110 is not expected to be triggered to perform the aperiodic SRS transmission on a SRS resource set with a timing offset smaller than the timing offset threshold. In this way, by applying an intelligent schedule at the BS 120, no additional improvement is needed at the UE 110.

Alternatively, the SRS resource set with a timing offset smaller than the timing offset threshold is allowed/expected to be trigged. Still refers to FIG. 4, the BS 120 transmit 410 first message(s) to the UE 110, where the first messages indicates at least one SRS resource set. In particular, the at least one SRS resource set includes a third resource set being configured with a timing offset smaller than a timing offset threshold. Then the UE 110 and the BS 120 perform 420 the aperiodic SRS transmission based on the first messages.

In some embodiments, the UE 110 drops at least part of resources included in the third resource set. In this way, the triggered SRS resource set(s) with a timing offset smaller than a timing offset threshold will be well handled.

In some embodiments, one first message may trigger/indicate a plurality of SRS resource sets, and only some of the plurality of SRS resource sets triggered too early (i.e., does not meet the minimum timing offset requirement).

In one embodiment, the UE 110 drops the SRS resource set(s) triggered too early. As for the others SRS resource set(s), the UE 110 determines whether to drop the others SRS resource set(s) independently. In the specific example of FIG. 5, the SRS resource set #1 520-1 and the SRS resource set #2 520-2 are trigged by the same first message, where the SRS resource set #1 520-1 does not meet the minimum timing offset requirement. The UE 110 drops the SRS resource set #1 520-1 first and determines whether to drop the SRS resource set #2 520-2 independently.

Alternatively, in another example, if some of the plurality of SRS resource sets indicated the first message triggered too early, the UE 110 drops all the SRS resource set indicated by the same first message. In other words, the UE 110 drops the SRS resource set(s) triggered too early and the other SRS resources set(s) indicates by the same first message accordingly. In the specific example of FIG. 5, the SRS resource set #1 520-1 and the SRS resource set #2 520-2 are trigged by the same first message, where the SRS resource set #1 520-1 does not meet the minimum timing offset requirement. The UE 110 drops both of the SRS resource set #1 520-1 and the SRS resource set #2 520-2.

Additionally, as discussed above, according to some of embodiments of the present discourse, the SRS resource sets may be configured to a specific CC. Therefore, the CC carrying the first message may be different from the CC of the SRS resource set triggered by the first message. Further, according to some of embodiments of the present discourse a single first message may trigger aperiodic SRS transmission in multiple CCs. Refer to FIG. 5 again, the SRS resource set #1 520-1 and the SRS resource set #2 520-2 may be trigged by the same first message 510. Further, the SRS resource set #1 520-1 is configured with CC #2, the SRS resource set #2 520-2 is configured with CC #1 and the first message 510 is carried in CC #1.

In this event, the UE 110 need to switch among different CCs when receiving the first message and scheduling SRS on the triggered SRS resource set(s). In view of the above, a relaxation of timing offset threshold (i.e., the minimum timing offset) may be introduced.

Specifically, if the first message and the at least one SRS resource set triggered by the first message correspond to a single CC, the UE 110 determines the timing offset threshold to be a first timing offset threshold. The first timing offset threshold may be a default value.

Further, if the first message and the at least one SRS resource set triggered by the first message correspond to more than one CC, the UE 110 determines the timing offset threshold to be a second timing offset threshold longer than the first timing offset threshold.

In one example, the second timing offset is pre-defined by such as the network operator, service provider or wireless standard organization (such as, 3GPP). In another example, the second timing offset is determined by the UE 110 and additionally reported to the BS 120 as UE capability.

Additional, a plurality of factors may be used when determining the second timing offset. One factor may be the number of CCs corresponding to both of the first message and the at least one SRS resource set indicated by the first message. For example, a corresponding or a function between the second timing offset and the number of CCs may be pre-defined and the UE 110 may determine the second timing offset based on the pre-defined corresponding or a function. Another factor may be sub-carrier spacing (SCS) of the CCs.

Additionally, similar with the processes discussed for the overlapped SRS resource sets, the linked association should also be considered when handing the SRS resource set configured with a timing offset smaller than a timing offset threshold, which means that if one SRS resource set if dropped due to failing to meet the minimum timing offset requirement, the operation on the other SRS resource set(s) indicated by the same first message should also be stipulated. The processes are similar with those with regard to the overlapped SRS resource sets. In the interests of brevity, similar discussions are omitted.

Additionally, in some embodiment, both overlapped SRS resource sets and SRS resource set(s) with a timing offset smaller than a timing offset threshold may be triggered simultaneously at the UE 110. In this event, the UE 110 handles the SRS resource set(s) with a timing offset smaller than a timing offset threshold first, and then handles the overlapped SRS resource sets.

According to embodiments of the present disclosure, the collision of the triggered SRS resource sets (such as, the SRS resource set being triggered too early or the triggered SRS resource sets being overlapped in time and/or frequency domain) may be well handled, and the configuring and updating procedures for SRS resource may be more flexible.

Figure 7:
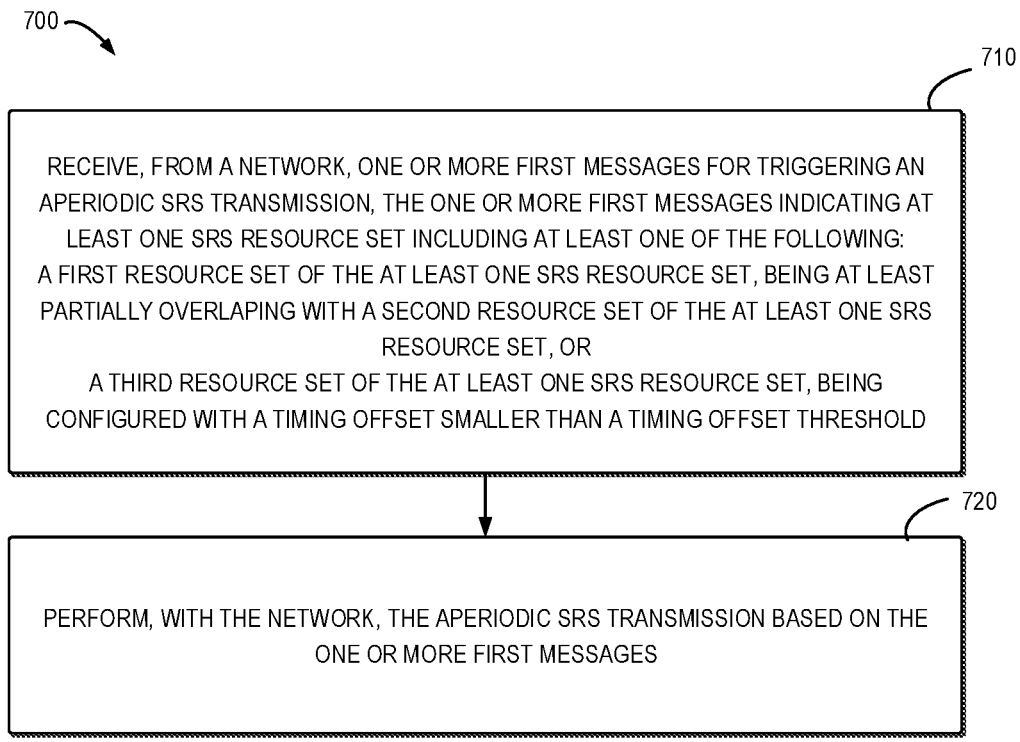
FIG. 7 illustrates a flowchart illustrating an example method of triggering and performing the aperiodic SRS transmission performed by the UE according to some example embodiments of the present disclosure.

FIG. 7 shows a flowchart of an example method 700 of triggering and performing the aperiodic SRS transmission in accordance with some embodiments of the present disclosure. The method 700 can be implemented at a device, for example the UE 110 shown in FIG. 1. It is to be understood that the method 700 may include additional blocks not shown and/or may omit some shown blocks, and the scope of the present disclosure is not limited in this regard.

At block 710, the UE 110 receives one or more first messages for triggering an aperiodic SRS transmission from a network (such as, the BS 120). The one or more first messages indicate at least one SRS resource set. In some embodiments, at least one SRS resource set includes a first resource being at least partially overlapping with a second resource set of the at least one SRS resource set. Alternatively, or in addition, at least one SRS resource set includes a third resource set being configured with a timing offset smaller than a timing offset threshold.

At block 720, the UE 110 performs the aperiodic SRS transmission based on the one or more first messages with the network.

In some embodiments, the UE 110 drops at least part of resources included in the first and second resource sets.

In some embodiments, if the first and second resource sets are indicated by a same first message of the one or more first messages, the UE 110 drops at least part of resources included in the first and second resource sets.

In some embodiments, if the first and second resource sets are indicated by different first messages of the one or more first messages, the UE 110 drops at least part of resources included in the first and second resource sets based on receiving sequence of the different first messages.

In some embodiments, the UE 110 drops at least part of resources included in the first and second resource sets based on usages of the first and the second resource sets.

Alternatively, or in addition, in some embodiments, the UE 110 drops at least part of resources included in the first and second resource sets based on identifications of the first and the second resource sets.

Alternatively, or in addition, in some embodiments, the UE 110 drops at least part of resources included in the first and second resource sets based on the numbers of resources included in the first and the second resource sets.

Alternatively, or in addition, in some embodiments, the UE 110 drops at least part of resources included in the first and second resource sets based on priorities of the first and the second resource sets.

In some embodiments, the UE 110 determines a target resource set from the first and second resource sets and further drops resources of an other resource set of the first and second resource rather than the target resource set.

Alternatively, or in addition, in some embodiments, the UE 110 determines a target resource set from the first and second resource sets and further drops the overlapped resources from the other resource set.

Alternatively, or in addition, in some embodiments, the UE 110 determines a target resource set from the first and second resource sets and further drops the overlapped resources from the target and the other source sets.

Alternatively, or in addition, in some embodiments, the UE 110 determines a target resource set from the first and second resource sets and further drops the overlapped resources from the target resource set and the resources of the other resource set.

In some embodiments, the first resource set corresponds to a first CC of a first frequency band, and the second first resource set corresponds to a different second CC of the same first frequency band.

In some embodiments, if the first resource set corresponds to a first CC of a first frequency band and the second resource set corresponds to a different second CC of a different second frequency band, the UE 110 drops at least part of resources included in the first and second resource sets based on the determined first and second frequency bands.

In some embodiments, the UE 110 drops at least part of resources included in the third resource set prior to dropping at least part of resources included in the first and second resource sets In some embodiments, the UE 110 drops at least part of resources included in the third resource set.

In some embodiments, the UE 110 drops the resources included in the third resource set indicated by a first message of the one or more first messages and dropping other resources indicated by the same first message.

In some embodiments, if the at least one SRS resource set is indicated by a same first message, the UE 110 determines the timing offset threshold based on the number of CCs corresponding to both of the first message and the at least one SRS resource set indicated by the first message Alternatively, or in addition, in some embodiments, if the at least one SRS resource set is indicated by a same first message, the UE 110 determines the timing offset threshold based on SCS of the CCs.

In some embodiments, the UE 110 determines the timing offset threshold to be a first timing offset threshold if the first message and the at least one SRS resource set correspond to a single CC. Alternatively, in some embodiments, the UE 110 determines the timing offset threshold to be a second timing offset threshold longer than the first timing offset threshold if the first message and the at least one SRS resource set correspond to more than one CC.

In some embodiments, the second timing offset threshold is pre-defined. Alternatively, in some embodiments, the second timing offset threshold is determined by the UE 110 based on the number of CCs corresponds to the first message and the at least one SRS resource set. Alternatively, in some embodiments, the second timing offset threshold is determined by the UE 110 based on SCS of the CCs.

In some embodiments, the UE 110 determines usage of the dropped resource, and drops other resources configured with the same usage from the at least one SRS resource set, or performing the aperiodic SRS transmission on the other resources.

In some embodiments, the one or more first messages are DCI messages.

Figure 8:
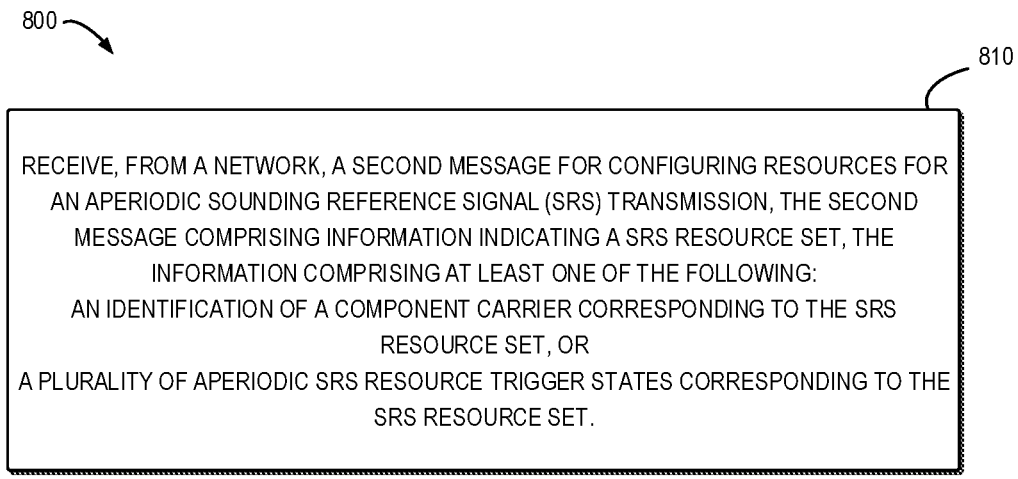
FIG. 8 illustrates a flowchart illustrating an example method of configuring SRS resources performed by the UE according to some example embodiments of the present disclosure.

FIG. 8 shows a flowchart of an example method 800 of configuring SRS resources in accordance with some embodiments of the present disclosure. The method 800 can be implemented at a device, for example the UE 110 shown in FIG. 1. It is to be understood that the method 800 may include additional blocks not shown and/or may omit some shown blocks, and the scope of the present disclosure is not limited in this regard.

At block 910, the UE 110 receives a second message for configuring resources for an aperiodic SRS transmission from a network. The second message comprises information indicating a SRS resource set. In some embodiments, the information comprises an identification of a CC corresponding to the SRS resource set. Alternatively, or in addition, in some embodiments, the information comprises a plurality of aperiodic SRS resource trigger states corresponding to the SRS resource set.

In some embodiments, the second message is a radio resource control (RRC) message.

Figure 9:
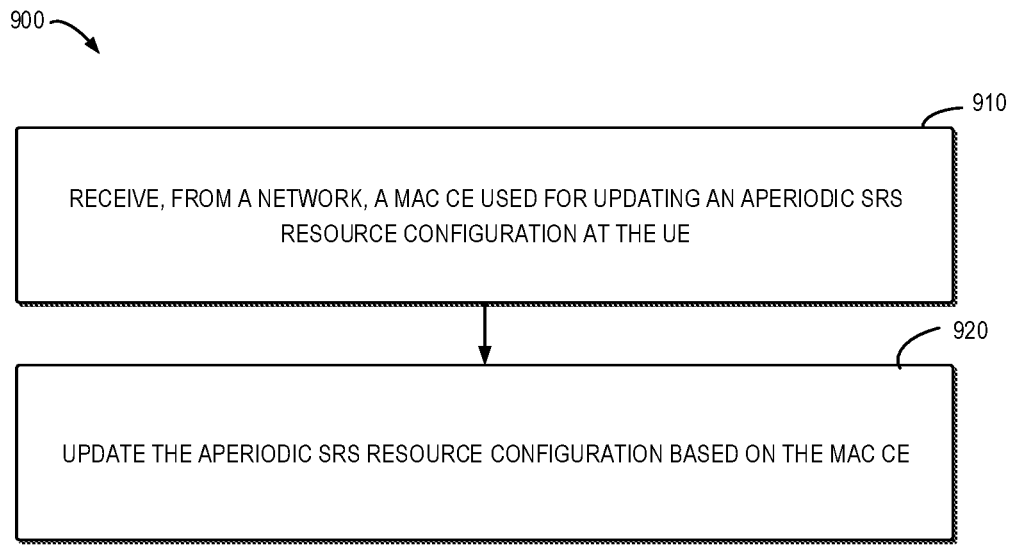
FIG. 9 illustrates a flowchart illustrating an example method of updating aperiodic SRS resource configuration performed by the UE according to some example embodiments of the present disclosure.

FIG. 9 shows a flowchart of an example method 900 of updating aperiodic SRS resource configuration in accordance with some embodiments of the present disclosure. The method 900 can be implemented at a device, for example the UE 110 shown in FIG. 1. It is to be understood that the method 900 may include additional blocks not shown and/or may omit some shown blocks, and the scope of the present disclosure is not limited in this regard.

At block 910, the UE 110 receives a MAC CE used for updating an aperiodic SRS resource configuration at the UE 110 from a network.

At block 920, the UE 110 updates the aperiodic SRS resource configuration based on the MAC CE.

In some embodiments, the MAC CE is used for updating a mapping between a SRS resource set and at least one aperiodic SRS resource trigger state. In this event, the MAC CE indicates at least one of the following: a cell identification of the SRS resource set, a BWP identification of the SRS resource set, an indication that indicates whether the SRS resource set corresponds to SUL, an identification of the SRS resource set, or information about the at least one of aperiodic SRS resource trigger state.

Alternatively, in some embodiments, the MAC CE is used for updating a SRS configuration for antenna switching. In this event, the MAC CE indicates at least one of the following: a cell identification of a SRS resource set, a BWP identification of the SRS resource set, an indication that indicates whether the SRS resource set corresponds to SUL, an identification of the SRS resource set, information about activated or de-activated SRS resources included in the SRS resource set, or the number of ports for each SRS resource.

Figure 10:
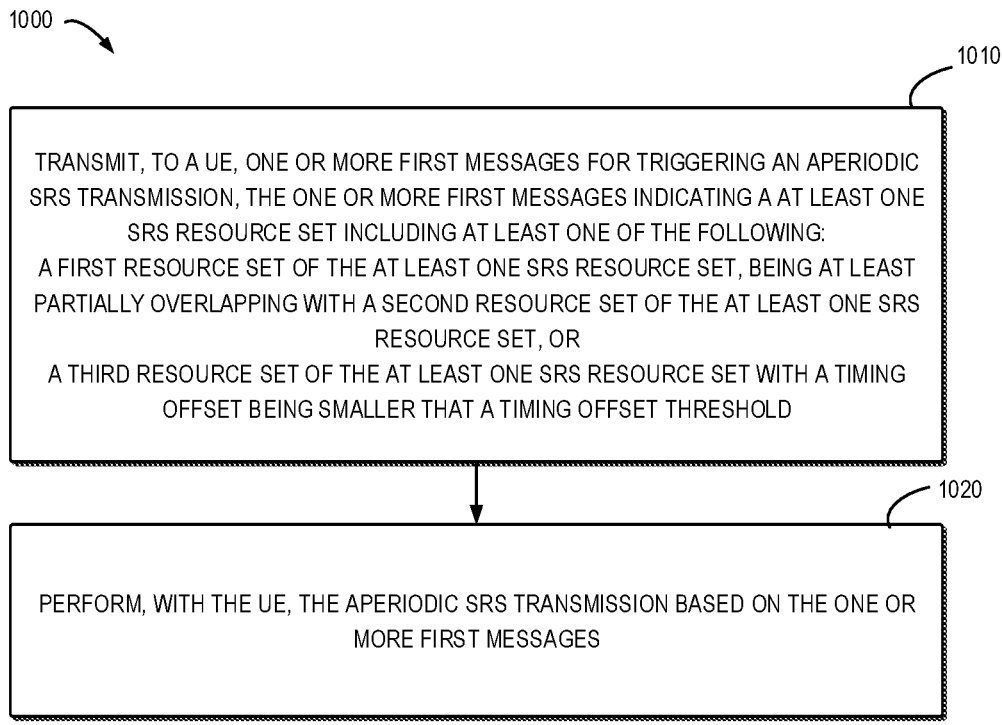
FIG. 10 illustrates a flowchart illustrating an example method of or triggering and performing the aperiodic SRS transmission performed by the BS according to some example embodiments of the present disclosure.

FIG. 10 shows a flowchart of an example method 1000 of triggering and performing the aperiodic SRS transmission in accordance with some embodiments of the present disclosure. The method 1000 can be implemented at a device, for example the BS 120 shown in FIG. 1. It is to be understood that the method 1000 may include additional blocks not shown and/or may omit some shown blocks, and the scope of the present disclosure is not limited in this regard.

At block 1010, the BS 120 transmits one or more first messages for triggering an aperiodic SRS transmission to the UE 110. The one or more first messages indicate at least one SRS resource set. In some embodiments, the at least one SRS resource set includes a first resource being at least partially overlapping with a second resource set of the at least one SRS resource set. Alternatively, or in addition, the at least one SRS resource set includes a third resource set being configured with a timing offset smaller than a timing offset threshold.

At block 1020, the BS 120 performs the aperiodic SRS transmission based on the one or more first messages with the network.

In some embodiments, the BS 120 drops at least part of resources included in the first and second resource sets.

In some embodiments, if the first and second resource sets are indicated by a same first message of the one or more first messages, the BS 120 drops at least part of resources included in the first and second resource sets.

In some embodiments, if the first and second resource sets are indicated by different first messages of the one or more first messages, the BS 120 drops at least part of resources included in the first and second resource sets based on receiving sequence of the different first messages.

In some embodiments, the BS 120 drops at least part of resources included in the first and second resource sets based on usages of the first and the second resource sets.

Alternatively, or in addition, in some embodiments, the BS 120 drops at least part of resources included in the first and second resource sets based on identifications of the first and the second resource sets.

Alternatively, or in addition, in some embodiments, the BS 120 drops at least part of resources included in the first and second resource sets based on the numbers of resources comprised in the first and the second resource sets.

Alternatively, or in addition, in some embodiments, the BS 120 drops at least part of resources included in the first and second resource sets based on priorities of the first and the second resource sets.

In some embodiments, the BS 120 determines a target resource set from the first and second resource sets and further drops resources of an other resource set of the first and second resource rather than the target resource set.

Alternatively, or in addition, in some embodiments, the BS 120 determines a target resource set from the first and second resource sets and further drops the overlapped resources from the other resource set.

Alternatively, or in addition, in some embodiments, the BS 120 determines a target resource set from the first and second resource sets and further drops the overlapped resources from the target and the other source sets.

Alternatively, or in addition, in some embodiments, the BS 120 determines a target resource set from the first and second resource sets and further drops the overlapped resources from the target resource set and the resources of the other resource set.

In some embodiments, the first resource set corresponds to a first CC of a first frequency band, and the second first resource set corresponds to a different second CC of the same first frequency band.

In some embodiments, if the first resource set corresponds to a first CC of a first frequency band and the second resource set corresponds to a different second CC of a different second frequency band, the BS 120 drops at least part of resources included in the first and second resource sets based on the determined first and second frequency bands.

In some embodiments, the BS 120 drops at least part of resources included in the third resource set prior to dropping at least part of resources included in the first and second resource sets In some embodiments, the BS 120 drops at least part of resources included in the third resource set.

In some embodiments, the BS 120 drops the resources included in the third resource set indicated by a first message of the one or more first messages and dropping other resources indicated by the same first message.

In some embodiments, if the at least one SRS resource set is indicated by a same first message, the BS 120 determines the timing offset threshold based on the number of CCs corresponding to both of the first message and the at least one SRS resource set indicated by the first message Alternatively, or in addition, in some embodiments, if the at least one SRS resource set is indicated by a same first message, the BS 120 determines the timing offset threshold based on SCS of the CCs.

In some embodiments, the BS 120 determines the timing offset threshold to be a first timing offset threshold if the first message and the at least one SRS resource set correspond to a single CC. Alternatively, in some embodiments, the BS 120 determines the timing offset threshold to be a second timing offset threshold longer than the first timing offset threshold if the first message and the at least one SRS resource set correspond to more than one CC.

In some embodiments, the second timing offset threshold is pre-defined. Alternatively, in some embodiments, the second timing offset threshold is determined by the UE 110 based on the number of CCs corresponds to the first message and the at least one SRS resource set. Alternatively, in some embodiments, the second timing offset threshold is determined by the UE 110 based on SCS of the CCs.

In some embodiments, the BS 120 determines usage of the dropped resource, and drops other resources configured with the same usage from the at least one SRS resource set, or performing the aperiodic SRS transmission on the other resources.

In some embodiments, the one or more first messages are DCI messages.

Figure 11:
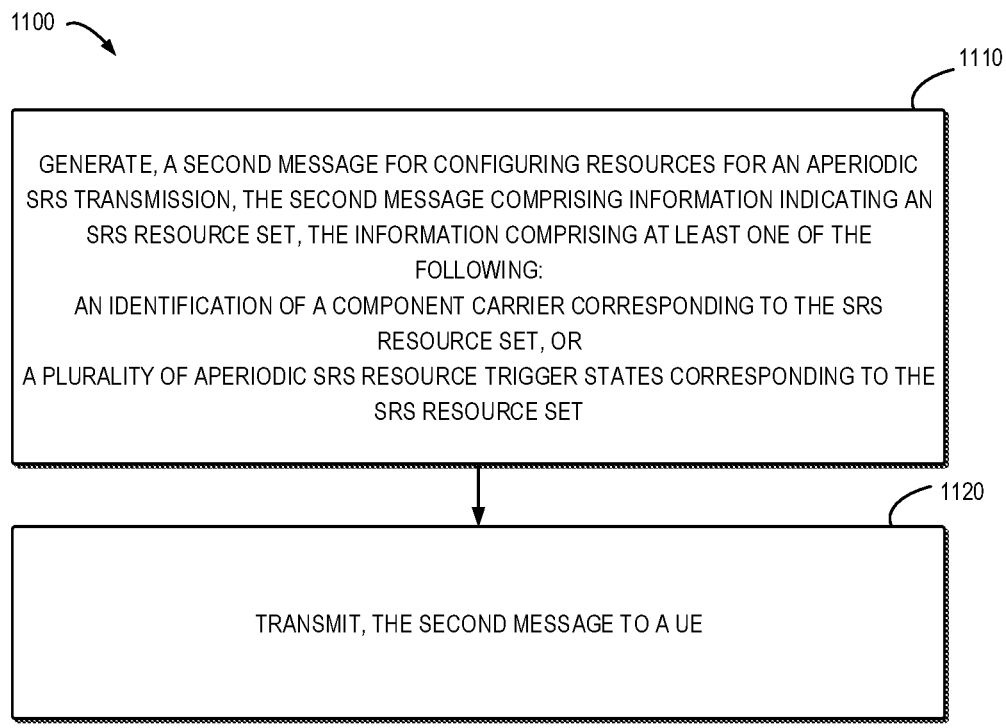
FIG. 11 illustrates a flowchart illustrating an example method of configuring SRS resources performed by the BS according to some example embodiments of the present disclosure.

FIG. 11 shows a flowchart of an example method 1100 of configuring SRS resources in accordance with some embodiments of the present disclosure. The method 1100 can be implemented at a device, for example the BS 120 shown in FIG. 1. It is to be understood that the method 1100 may include additional blocks not shown and/or may omit some shown blocks, and the scope of the present disclosure is not limited in this regard.

At block 1110, the BS 120 generates a second message for configuring resources for an aperiodic SRS transmission. The second message comprises information indicating a SRS resource set. In some embodiments, the information comprises an identification of a CC corresponding to the SRS resource set. Alternatively, or in addition, the information comprises a plurality of aperiodic SRS resource trigger states corresponding to the SRS resource set.

At block 1120, the BS 120 transmits the second message to a UE 110.

In some embodiments, the second message is a radio resource control (RRC) message.

Figure 12:
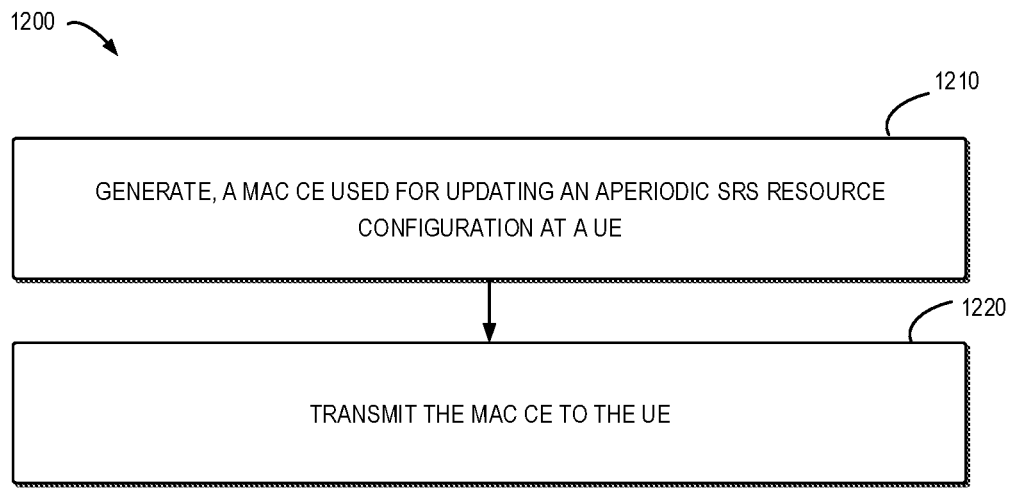
FIG. 12 illustrates a flowchart illustrating an example method of updating aperiodic SRS resource configuration performed by the BS according to some example embodiments of the present disclosure.

FIG. 12 shows a flowchart of an example method 1200 of updating aperiodic SRS resource configuration in accordance with some embodiments of the present disclosure. The method 1200 can be implemented at a device, for example the BS 120 shown in FIG. 1. It is to be understood that the method 1200 may include additional blocks not shown and/or may omit some shown blocks, and the scope of the present disclosure is not limited in this regard.

At block 1210, the BS 120 generates a MAC CE used for updating an aperiodic SRS resource configuration at the UE 110.

At block 1220, the BS 120 transmits the MAC CE to the UE 110.

In some embodiments, the MAC CE is used for updating a mapping between a SRS resource set and at least one aperiodic SRS resource trigger state. In this event, the MAC CE indicates at least one of the following: a cell identification of the SRS resource set, a BWP identification of the SRS resource set, an indication that indicates whether the SRS resource set corresponds to SUL, an identification of the SRS resource set, or information about the at least one of aperiodic SRS resource trigger state.

Alternatively, in some embodiments, the MAC CE is used for updating a SRS configuration for antenna switching. In this event, the MAC CE indicates at least one of the following: a cell identification of a SRS resource set, a BWP identification of the SRS resource set, an indication that indicates whether the SRS resource set corresponds to SUL, an identification of the SRS resource set, information about activated or de-activated SRS resources included in the SRS resource set, or the number of ports for each SRS resource.

Figure 13:
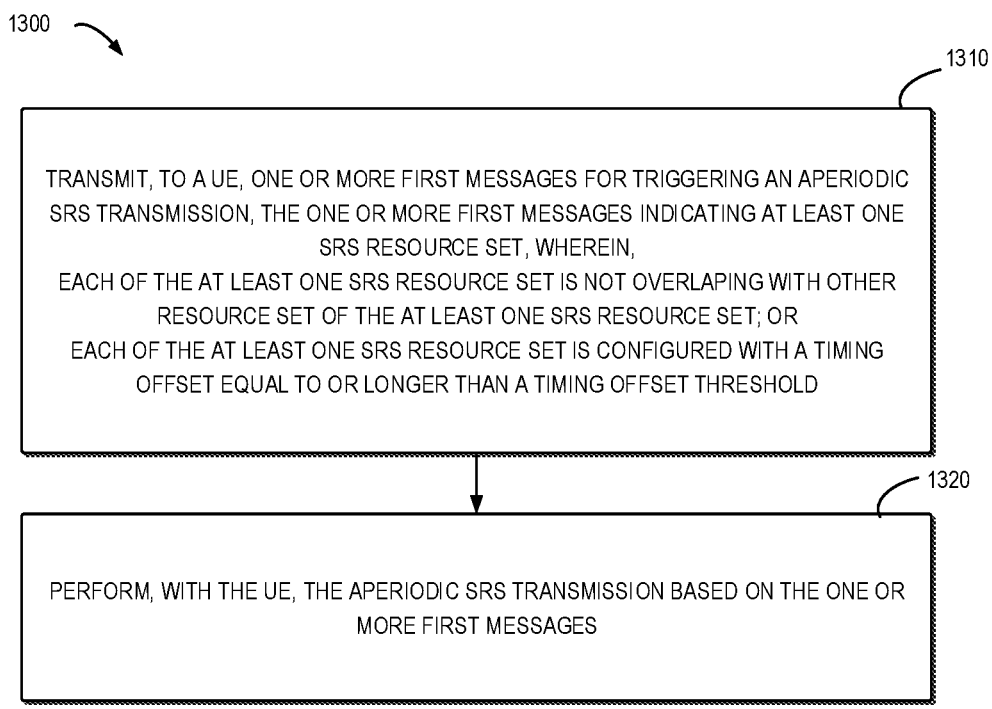
FIG. 13 illustrates a flowchart illustrating another example method of or triggering and performing the aperiodic SRS transmission performed by the BS according to some example embodiments of the present disclosure.

FIG. 13 shows a flowchart of an example method 1300 of triggering and performing the aperiodic SRS transmission in accordance with some embodiments of the present disclosure. The method 1300 can be implemented at a device, for example the BS 120 shown in FIG. 1. It is to be understood that the method 1300 may include additional blocks not shown and/or may omit some shown blocks, and the scope of the present disclosure is not limited in this regard.

At block 1310, the BS 120 transmits one or more first messages for triggering an aperiodic SRS transmission to a UE 110. The one or more first messages indicate at least one SRS resource set. In some embodiments, each of the at least one SRS resource set is not overlapping with other resource set of the at least one SRS resource set, such that the UE 110 is not expected to be triggered to perform the aperiodic SRS transmission on overlapped resources. Alternatively, or in addition, in some embodiments, each of the at least one SRS resource set is configured with a timing offset longer than a timing offset threshold, such that the UE 110 is not expected to be triggered to perform the aperiodic SRS transmission on an SRS resource set with a timing offset smaller than the timing offset threshold.

At block 1320, the BS 120 performs the aperiodic SRS transmission based on the one or more first messages with the UE 110.

Figure 14:
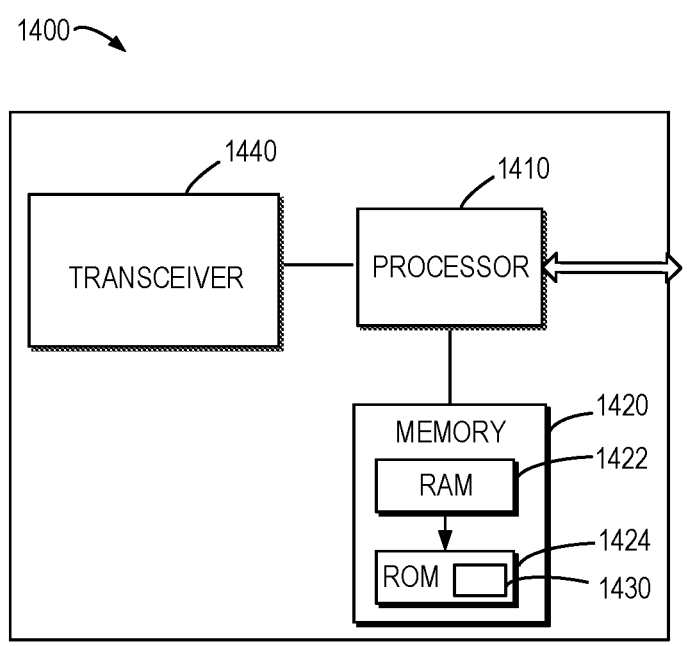
FIG. 14 illustrates a simplified block diagram of a device that is suitable for implementing embodiments of the present disclosure.

FIG. 14 is a simplified block diagram of a device 1400 that is suitable for implementing embodiments of the present disclosure. For example, the BS 120 and the UE 110 can be implemented by the device 1400. As shown, the device 1400 includes a processor 1410, a memory 1420 coupled to the processor 1410, and a transceiver 1440 coupled to the processor 1410.

The transceiver 1440 is for bidirectional communications. The transceiver 1440 is coupled to at least one antenna to facilitate communication. The transceiver 1440 can comprise a transmitter circuitry (e.g., associated with one or more transmit chains) and/or a receiver circuitry (e.g., associated with one or more receive chains). The transmitter circuitry and receiver circuitry can employ common circuit elements, distinct circuit elements, or a combination thereof.

The processor 1410 may be of any type suitable to the local technical network and may include one or more of the following: general purpose computers, special purpose computers, microprocessors, digital signal processors (DSPs) and processors based on multicore processor architecture, as non-limiting examples. The device 1400 may have multiple processors, such as an application specific integrated circuit chip that is slaved in time to a clock which synchronizes the main processor.

The memory 1420 may include one or more non-volatile memories and one or more volatile memories. Examples of the non-volatile memories include, but are not limited to, a Read Only Memory (ROM) 1424, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1422 and other volatile memories that will not last in the power-down duration.

A computer program 1430 includes computer executable instructions that are executed by the associated processor 1410. The program 1430 may be stored in the ROM 1424. The processor 1410 may perform any suitable actions and processing by loading the program 1430 into the RAM 1422.

The embodiments of the present disclosure may be implemented by means of the program 1430 so that the device 1400 may perform any process of the disclosure as discussed with reference to FIGS. 2-13. The embodiments of the present disclosure may also be implemented by hardware or by a combination of software and hardware.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 700 to 1300 as described above with reference to FIGS. 7 to 13.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A processor of a user equipment (UE) configured to perform operations comprising:
    receiving, from a network, one or more first messages for triggering an aperiodic sounding reference signal (SRS) transmission, the one or more first messages indicating at least one SRS resource set including at least one of the following:
    a first resource set of the at least one SRS resource set, being at least partially overlapping with a second resource set of the at least one SRS resource set, or a third resource set of the at least one SRS resource set, being configured with a timing offset smaller than a timing offset threshold; and
    performing, with the network, the aperiodic SRS transmission based on the one or more first messages, wherein the aperiodic SRS transmission comprises dropping at least part of resources included in the first and second resource sets in accordance with a determination that the first and second resource sets are indicated by a same first message of the one or more first messages.

2. The processor of claim 1, wherein dropping at least part of resources included in the first and second resource sets further comprises:
    if the first and second resource sets are indicated by different first messages of the one or more first messages, dropping at least part of resources included in the first and second resource sets based on receiving sequence of the different first messages.

3. The processor of claim 1, wherein dropping at least part of resources included in the first and second resource sets further comprises:
    dropping at least part of resources included in the first and second resource sets based on at least one of the following:
        usages of the first and the second resource sets,
        identifications of the first and the second resource sets,
        a number of resources included in the first and the second resource sets, or
        priorities of the first and the second resource sets.

4. The processor of claim 1, wherein dropping at least part of resources included in the first and second resource sets further comprises:
    determining a target resource set from the first and second resource sets; and
    dropping at least part of resources included in the first and second resource sets by one of the following:
        dropping resources of an other resource set of the first and second resource sets rather than the target resource set;
        dropping the overlapped resources from the other resource set;
        dropping the overlapped resources from the target and the other resource sets; or
        dropping, the overlapped resources from the target resource set and the resources of the other resource set.

5. The processor of claim 1, wherein the first resource set corresponds to a first component carrier of a first frequency band, and the second resource set corresponds to a different second component carrier of the same first frequency band.

6. The processor of claim 1, wherein dropping at least part of resources included in the first and second resource sets further comprises:
    if the first resource set corresponds to a first component carrier of a first frequency band and the second resource set corresponds to a different second component carrier of a different second frequency band, dropping at least part of resources included in the first and second resource sets based on the determined first and second frequency bands.

7. The processor of claim 1, wherein dropping at least part of resources included in the first and second resource sets comprises:
    prior to dropping at least part of resources included in the first and second resource sets, dropping at least part of resources included in the third resource set.

8. The processor of claim 1, wherein performing the aperiodic SRS transmission based on the one or more first messages comprises:
    dropping at least part of resources included in the third resource set.

9. The processor of claim 8, wherein dropping at least part of resources included in the third resource set comprises:
    dropping the resources included in the third resource set indicated by a first message of the one or more first messages and dropping other resources indicated by the same first message.

10. The processor of claim 1, wherein the operation further comprises:
    if the at least one SRS resource set is indicated by a same first message, determining the timing offset threshold based on at least one of:
        a number of component carriers corresponding to both of the first message and the at least one SRS resource set indicated by the first message, or
        sub-carrier spacing (SCS) of the component carriers.

11. The processor of claim 10, wherein determining the timing offset threshold comprises:
  determining the timing offset threshold to be a first timing offset threshold if the first message and the at least one SRS resource set correspond to a single component carrier, or
  determining the timing offset threshold to be a second timing offset threshold longer than the first timing offset threshold if the first message and the at least one SRS resource set correspond to more than one component carrier.

12. The processor of claim 11, wherein,
  the second timing offset threshold is pre-defined, or
  the second timing offset threshold is determined by the UE based on at least on of:
  the number of component carriers corresponds to the first message and the at least one SRS resource set, or
  sub-carrier spacing (SCS) of the component carriers.

13. The processor of claim 1, wherein the operations further comprise:
  determining usage of the dropped resource; and
  dropping other resources configured with the same usage from the at least one SRS resource set, or performing the aperiodic SRS transmission on the other resources.

14. The processor of claim 1, wherein the one or more first messages are downlink control information (DCI) messages.

15. An apparatus comprising processing circuitry configured to:
  process, based on signaling received from a network, one or more first messages for triggering an aperiodic sounding reference signal (SRS) transmission, the one or more first messages indicating at least one SRS resource set including at least one of the following:
    a first resource set of the at least one SRS resource set, being at least partially overlapping with a second resource set of the at least one SRS resource set, or
    a third resource set of the at least one SRS resource set, being configured with a timing offset smaller than a timing offset threshold; and
  performing, with the network, the aperiodic SRS transmission based on the one or more first messages, wherein the aperiodic SRS transmission comprises dropping at least part of resources included in the first and second resource sets in accordance with a determination that the first and second resource sets are indicated by a same first message of the one or more first messages.

16. The apparatus of claim 15, wherein dropping at least part of resources included in the first and second resource sets further comprises:
  if the first and second resource sets are indicated by different first messages of the one or more first messages, dropping at least part of resources included in the first and second resource sets based on receiving sequence of the different first messages.

17. The apparatus of claim 15, wherein dropping at least part of resources included in the first and second resource sets further comprises:
  dropping at least part of resources included in the first and second resource sets based on at least one of the following:
  usages of the first and the second resource sets,
  identifications of the first and the second resource sets,
  a number of resources included in the first and the second resource sets, or
  priorities of the first and the second resource sets.

18. The apparatus of claim 15, wherein dropping at least part of resources included in the first and second resource sets further comprises:
  determining a target resource set from the first and second resource sets; and
  dropping at least part of resources included in the first and second resource sets by one of the following:
  dropping resources of an other resource set of the first and second resource sets rather than the target resource set;
  dropping the overlapped resources from the other resource set;
  dropping the overlapped resources from the target and the other resource sets; or
  dropping, the overlapped resources from the target resource set and the resources of the other resource set.

* * * * *